Dec. 23, 1930.     P. ITZI     1,786,345
ELECTRIC COOKER
Filed Dec. 11, 1929     4 Sheets-Sheet 1
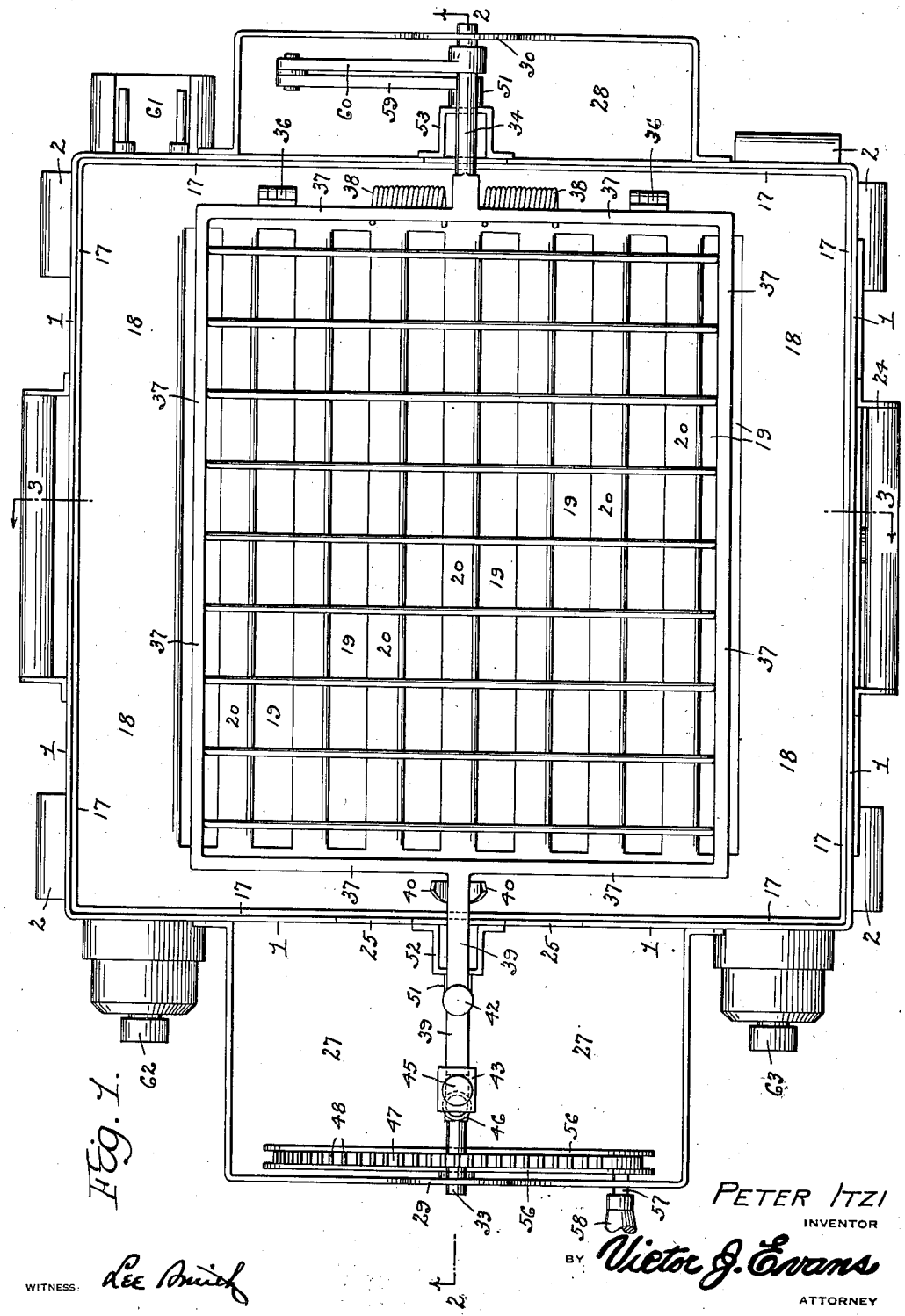
PETER ITZI
INVENTOR
BY
ATTORNEY

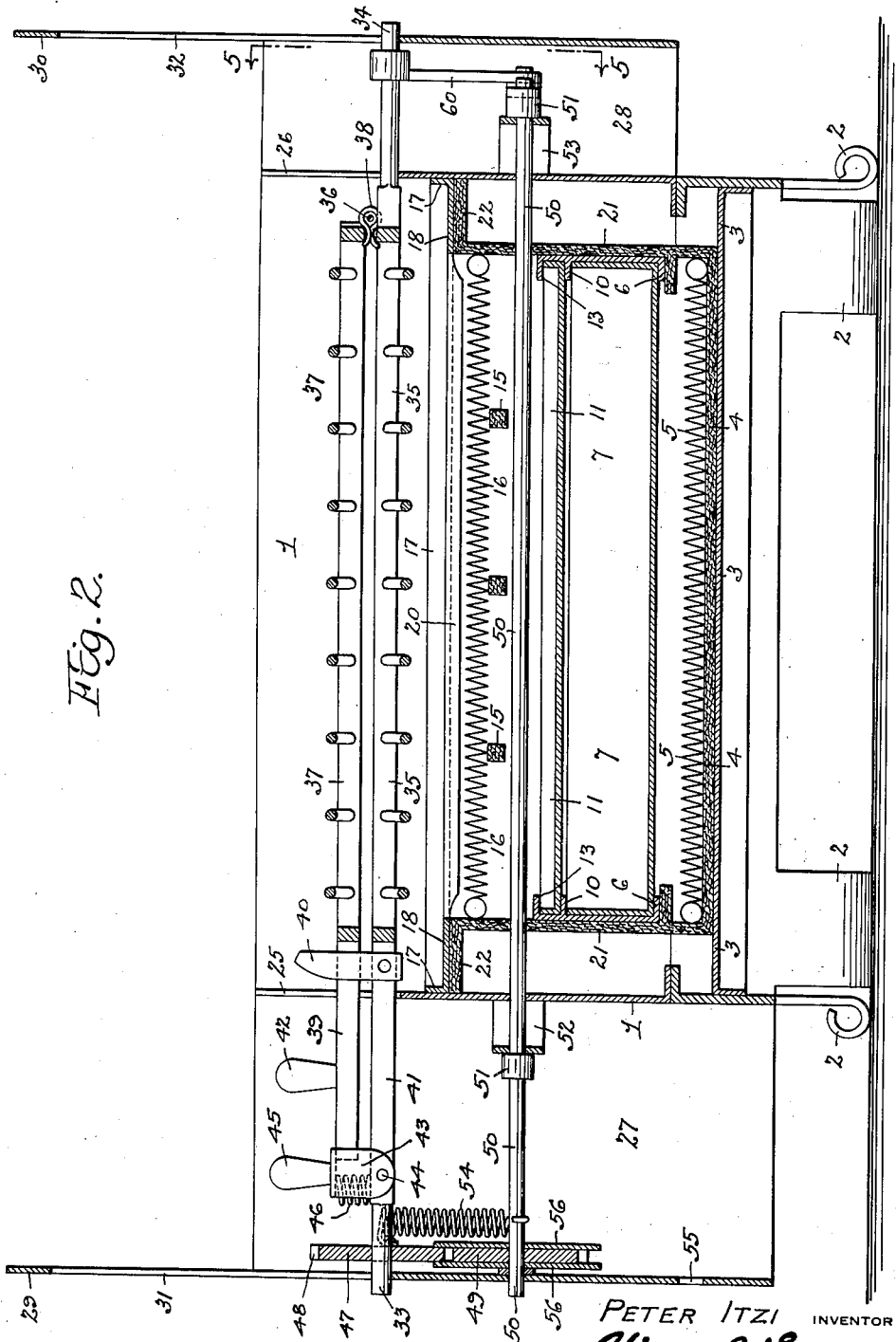

Dec. 23, 1930.  P. ITZI  1,786,345
ELECTRIC COOKER
Filed Dec. 11, 1929  4 Sheets-Sheet 3
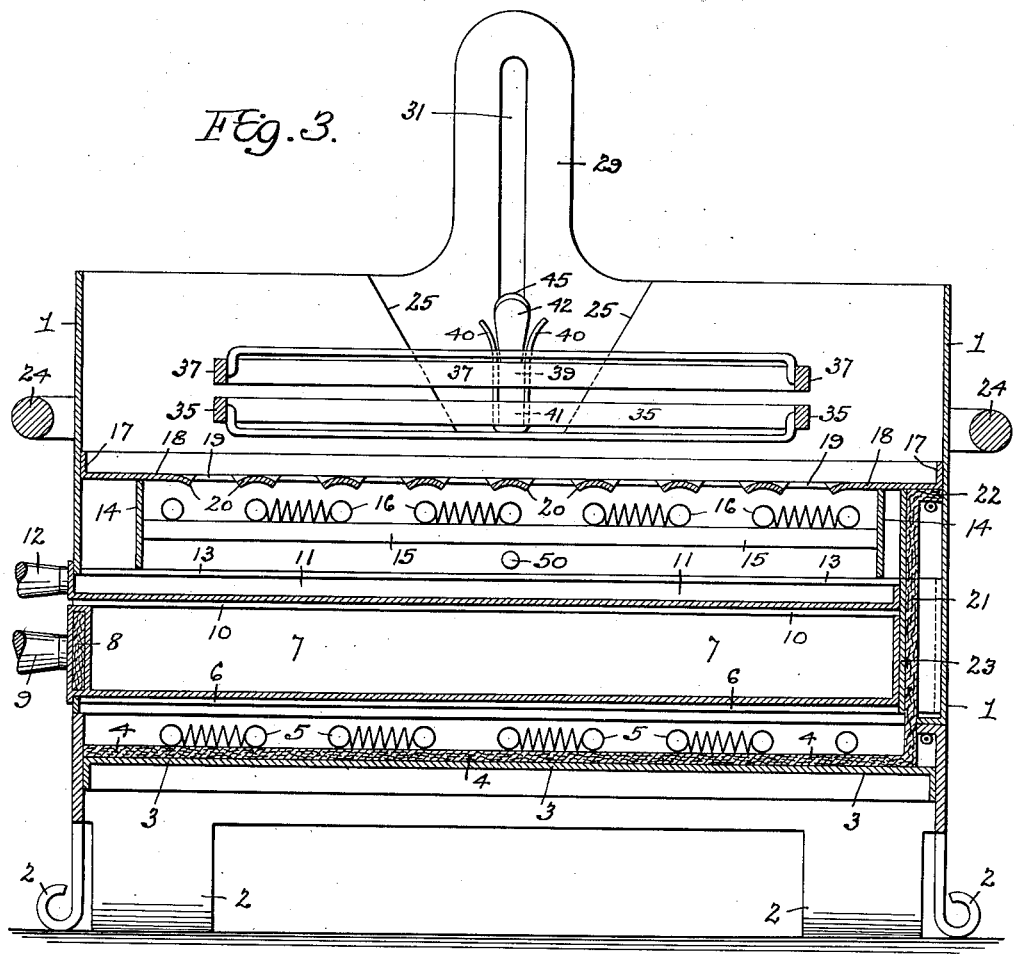
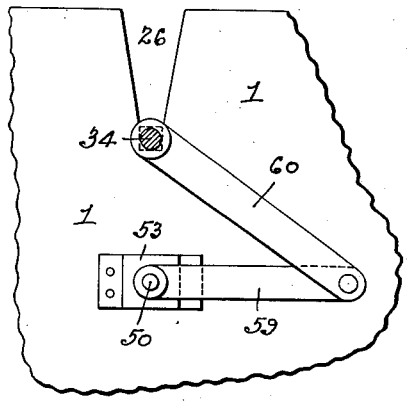
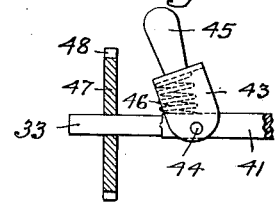
PETER ITZI
INVENTOR Dec. 23, 1930.                    P. ITZI                    1,786,345
                              ELECTRIC COOKER
                           Filed Dec. 11, 1929        4 Sheets-Sheet 4
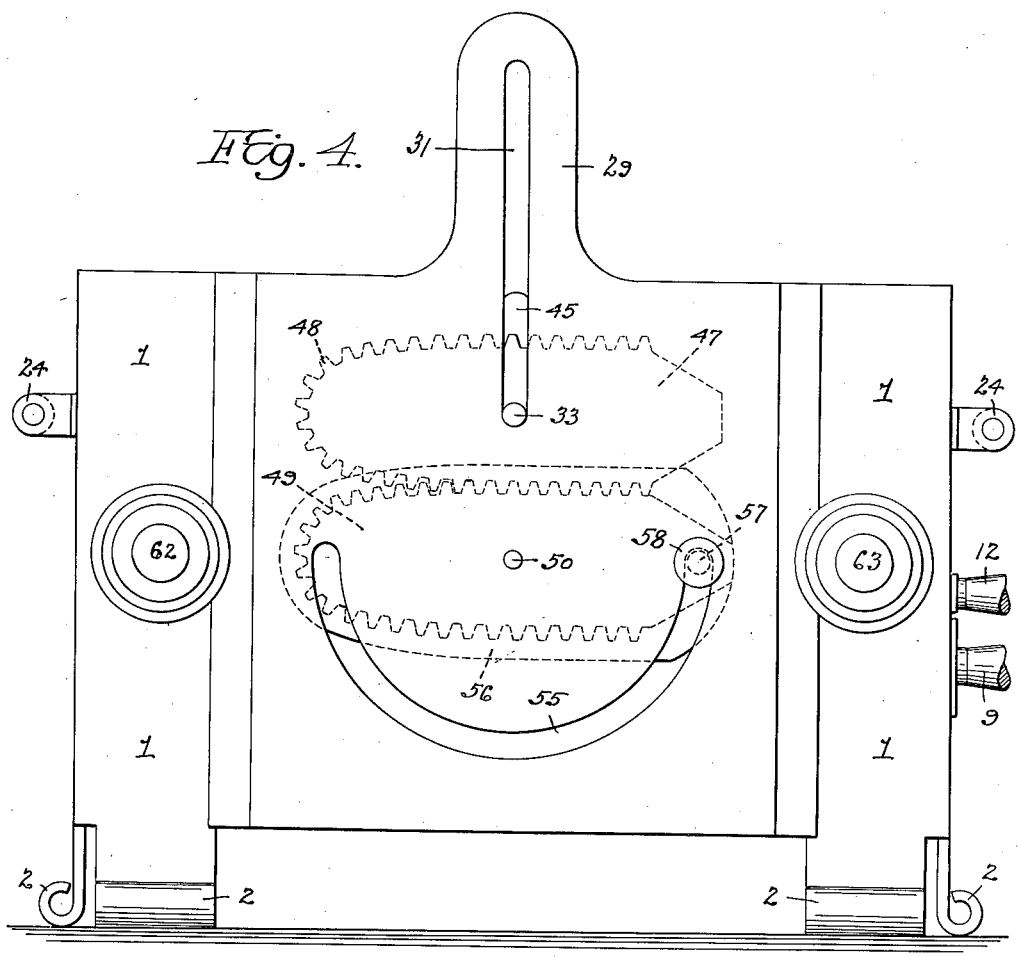
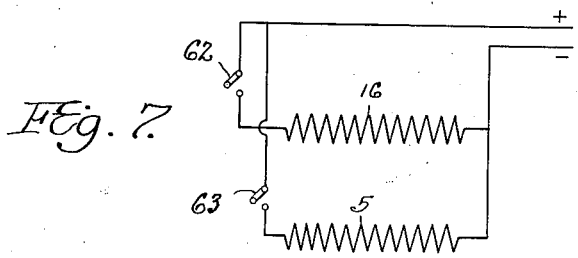
PETER ITZI
INVENTOR
BY Victor J. Evans
ATTORNEY
WITNESS Patented Dec. 23, 1930

1,786,345

UNITED STATES PATENT OFFICE

PETER ITZI, OF PHILADELPHIA, PENNSYLVANIA

ELECTRIC COOKER

Application filed December 11, 1929. Serial No. 413,346.

My present invention has reference to an electric cooker, and my object is the provision of a device for this purpose which is small, light and portable and which may successfully be employed for baking, broiling, toasting, and otherwise cooking food stuff.

A further and important object of the invention is the provision of an electric cooker in which electricity may be directed to heating coils arranged beneath a removable oven or beneath a grid, or simultaneously between both of these members so that food stuff may be cooked therein or broiled or toasted on the grid.

A further object is the provision of an electric cooker in which the grid comprises a two part member, the said sections being normally latched one on the other, but spring influenced away from each other when the latch is released and wherein the grid is so mounted that both a vertical and rotary motion may be imparted thereto to reverse the sides or faces thereof, so that the food stuff may be broiled or toasted upon both of the sides or faces thereof.

To the attainment of the foregoing broadly recited objects and others which will present themselves as the nature of the invention is better understood, the improvement further resides in certain other novel features of construction, combination and operative association of parts, one satisfactory embodiment of which is disclosed by the accompanying drawings.

In the drawings:

Figure 1 is a top plan view of my improved cooker.

Figure 2 is a sectional view on the line 2—2 of Figure 1.

Figure 3 is a sectional view on the line 3—3 of Figure 1.

Figure 4 is an end elevation of the improvement.

Figure 5 is a detail sectional view approximately on the line 5—5 of Figure 2.

Figure 6 is a detail side elevation of the shaft end of the grid section that carries the latch and the gear, the latter being in section.

Except for the handle portions, the improvement is mainly constructed of metal. The improvement includes a substantially rectangular body 1 that rests on feet 2. Preferably the feet are formed by reduced extensions at the corners of the body and the edges of the said extensions are rolled, as disclosed by the drawings. In the body, directly above the feet portions 2 thereof there is fixed the flanged base 3 of the improvement. On this base there rests on and is secured a sheet of insulating material 4 and on the sheet 4 there are arranged the lower heating coils 5. Above the coils the sides of the body have fixed thereon angle plates 6 that provide both guides and supports for the pan-like oven 7. The outer face of the oven and if desired, the sides thereof comprise two spaced plates or may be in the nature of a hollow member to receive therein an insulating sheet 8. The outer plate, at the front of the oven 7 has its ends and lower edge extended to fully cover the opening on what I will term the front of the improvement to fully cover the same. The oven 7, upon its said end has fixed thereon a handle 9.

The open top of the oven has its edges guided beneath flanges 10 which are arranged parallel with the flanges 6, and the said flanges 10 provide both guides and a support for a drip pan 11. The outer face of the drip pan is also flanged and has secured thereon a handle 12. The edges at the top or open end of the drip pan 11 are guided along a flange 13 which is fixed in the body directly above the flange 10, and this flange 13 preferably supports thereon transverse plates 14 to whose inner face there are fixed longitudinal plates 15, and between these plates 15 there are secured the ends of the upper heating coils 16. Resting upon both of the plates 14 and 15 and secured to the inner faces of the sides and ends of the body 1 there is a continuous flange 17 formed on a plate 18. The plate 18 is provided with a series of equidistantly spaced openings 19 and the walls between these openings are arched, as at 20. The plate 18 provides the upper element of the stove proper.

The insulating sheet 4 has its rear end extended at an upward angle, adjacent to the rear wall of the body 1, as indicated by the numeral 21. The upper end of this extension is flanged, as at 22, and provides an additional support for the top plate 18. A metal plate 23 is arranged on the inner face of the extension 21 and provides an abutment wall for both the oven pan 7 and for the drip pan 11.

The front and rear walls of the body 1, adjacent to the open top thereof have fixed thereon substantially U-shaped hand grips 24, whereby the device may be gripped and conveyed to desired places.

The ends of the body 1, from the open top thereof are each formed with substantially V-shaped openings or notches 25 and 26, respectively. The V-shaped notch 25 is of a greater width than the notch 26. Fixed on the said ends of the body and closing the notches 25 and 26 there are open compartments 27 and 28, respectively. The outer walls of the compartments 27 and 28 are centrally formed with upwardly projecting portions or plates 29 and 30, respectively, and these extensions are centrally provided with elongated vertically arranged slots 31 and 32, respectively. These slots provide guides for the shaft or trunnion ends 33 and 34 for the normally lower sections of a grid 35. The grid section 35 is, of course, of a substantially rectangular formation and the said grid is normally disposed over the top plate 18 of the cooker. The trunnions 33 and 34 merge into inwardly arranged cross sectionally squared portions and other portions which, of course, are centrally fixed on the ends of the grid section 35. To the center of the extension connected with the trunnion 34 there is hinged, as at 36, the end of the normally upper grid section 37. A coil spring 38 at the hinged ends of the grid sections 35 and 37 exerts an outward pressure between said grid sections. The spring is of a sufficient length to normally swing the grid section 37 outwardly and at a right angle to the grid section 35. The second or non-hinged end of the grid section 37 is centrally formed in the nature of a squared bar 39 and this bar is received between spaced guide plates 40 fixed on the square extension 41 for the trunnion 33. The bar 39 is provided with a knob or handle 42 and the outer end of the said bar 39 is designed to be engaged by a cross sectionally U-shaped clamp 43 whose sides are pivoted, as at 44, to the bar 41. The clamp 43 has a handle extension 45, and there is arranged between the bar 41 and the said clamp a coil spring 46 which normally influences the clamp to engage with the bar 39 and thereby hold the grid sections 35 and 37 in longitudinal alinement. A release of the catch will, as previously stated, permit the grid section 37 swinging away from the grid section 35.

Centrally fixed on the trunnion 33 there is a substantially rectangular plate 47, which, however, has one of its ends semi-circular and its other end struck at a curvature. The edges and semi-circular corners of the plate 47 are provided with teeth 48. Thus the plate is in the nature of a gear. The teeth of the substantially rectangular gear plate 47 are designed to mesh with teeth on a similar gear plate 49. This gear plate is fixed on a shaft 50 which is journaled longitudinally through the housing 1 beneath the upper heating coils 16. The shaft 50 is held from longitudinal movement by collars 51 that are fixed thereon and which abut with the ends of the substantially U-shaped bearings 52 and 53 in the respective housings 27 and 28. There is fixed on the shaft 50 one end of a coil spring 54, and the second end of this spring is fixed on the inner face of the gear 47.

The outer face of the compartment 27 is provided with a semi-circular slot 55 struck from the bearing opening in the said face through which the end of the shaft key is journaled and there are fixed on the sides of the gear 49 flanges 56 and to the outer flange there is secured a stud 57 on whose end there is fixed a handle 58. The end of the shaft that is received in the housing 28 has secured thereto an angle arm 59. To the outer end of this arm there is pivoted a link 60 which is also pivotally connected with the trunnion 34. The trunnion 34 and the rod or bar 41 rest on the lower wall of the notches 25 and 26 when the grid sections are latched together and are in horizontal position, but it will be obvious that by turning the handle 58 around the semi-circular slot 55 the flanged gear 49 will turn the gear 47 to impart first a vertical and then a turning movement to the grid to bring either of the sections 35 or 37 thereof over the grated top of the stove. Of course, the turning of the gear 49 will turn the shaft 50 and will cause the arm 59 on the end thereof to impart motion to the link 60 which will raise and lower the trunnion 34. The spring 54 serves to return the parts to initial position and as a matter-of-fact, automatically returns the said parts after the same have described one-fourth of their revolution.

The numeral 61 designates a socket that is designed to be engaged by a plug on a cord which is connected to the house electric system. The poles of the socket are connected with wires that lead to the respective upper and lower heating coils, the wiring system being disclosed by Figure 7 of the drawings. The control of the electricity to either of the respective coils is regulated through the medium of switches 62 and 63 which are arranged on the end of the device to the opposite sides of the compartment 27. It will be apparent that by closing one of the switches the current of electricity may be directed to one of the heating coils and that by closing both of the switches the electricity will be directed to both of the heating coils and thus it will be noted that food stuff may be cooked either on the grid or on the baking pan separately or simultaneously.

As previously stated, different classes of food stuff may be cooked with my improvement and in an easy and expeditious manner. The grid may be employed for holding meats to be broiled or for holding bread to be toasted. When meats are broiled the juice will fall through the grated top of the improvement and received in the drip pan. The grates on the top of the improvement are disposed over the heating coils 16 so that the dripping juice will not contact with such coils. The oven may be employed for toasting, baking or as a matter-of-fact, for broiling food stuff, while water may be heated in a pan by simply placing the same over the grid.

The simplicity and advantages of my improvement will, it is thought, be apparent to those skilled in the art to which such invention relates so that further detailed description will not be required but obviously I do not wish to be restricted to the precise details herein set forth and, therefore, hold myself entitled to make such changes therefrom as fairly fall within the scope of what I claim.

Having described the invention, I claim:

1. An electric cooker comprising a casing, a slidable drawer in the casing comprising an oven, a heating coil below the oven, a drip pan slidable in the casing and providing the top for the oven, a heating coil above the drip pan, a grate comprising spaced bars which are downwardly arched and which cover the last mentioned heating coil, a turnable slice holding grid above the grate, and handle operated means for turning the grid and switch controlled means for directing a source of electricity to either or to both of the heating coils.

2. In an electric heater, a slice holding grid comprising two hingedly connected sections, means for swinging the sections away from each other, means for latching the sections associated, trunnions on the ends of one of the sections, guide means for the trunnions, a shaft journaled in bearings below the trunnions, an offset arm on one end of the shaft, a link connection between the arm and one of the trunnions, a substantially rectangular gear having a rounded end fixed on the second end of the shaft, a similar gear on one of the trunnions in mesh with the first mentioned gear, a coil spring connecting the last mentioned gear with the shaft, an operating handle on the first mentioned gear and a semi-circular guide for the handle.

3. An electric cooker comprising a substantially rectangular casing supported on legs, and having compartments on the ends thereof provided with vertical slots and the casing having slots in register with said vertical slots, a slice holding grid comprising two sections, having central extensions which merge into trunnions that are received through the first mentioned slots and having central extensions which are received through the last mentioned slots, guide means for the sections, a spring hinge connecting the sections, a pivotally supported spring influenced handle operated latch for holding the sections assembled, a shaft journaled in bearings below the grid, means holding the shaft from longitudinal movement, an angle arm on one end of the shaft, a link connection between the said arm and one of the trunnions, a substantially rectangular gear having a rounded end fixed on the second trunnion, a substantially rectangular flanged gear fixed on the shaft and in mesh with the first mentioned gear, a spring connection between the first mentioned gear and the shaft, one of the compartments having its outer wall provided with a semi-circular slot and a handle member having one end received through the slot and secured to the flanged gear.

In testimony whereof I affix my signature.

PETER ITZI.